Aug. 23, 1966  R. M. MILLER  3,267,662
FLUID VENTING DEVICE
Filed Nov. 20, 1962

INVENTOR
ROBERT M. MILLER

BY  *Martha L. Ross*
AGENT

United States Patent Office 3,267,662
Patented August 23, 1966

3,267,662
FLUID VENTING DEVICE
Robert M. Miller, Annandale, Va., assignor to Atlantic Research Corporation, Fairfax, Va., a corporation of Virginia
Filed Nov. 20, 1962, Ser. No. 238,958
24 Claims. (Cl. 60—35.6)

This invention relates to rocket motors having filament-wound casings and more particularly to a device for effecting thrust modulation, e.g., reduction, termination or reversal, in these rocket motors.

Broadly, the rocket motors of this invention comprise a conventional casing composed of layers of wound filaments impregnated with a resinous material. These casings contain a combustion chamber in which propellant material is burned to generate gases. The propulsive thrust is developed by the high velocity discharge of these gases through a restricted orifice, such as a nozzle, attached to the aft end of the motor.

To effectively control the flight path of such a rocket motor, it is often necessary to modulate the thrust of the motor at a particular time. Among the many devices heretofore utilized for thrust modulation in rocket motors are sealed ports appropriately positioned in the motor casing. When these sealed ports are ruptured or blown open, as by igniting an explosive charge adjacent to them, combustion gases escape through them as well as through the nozzle. The number, size and angle of these ports can be prescheduled to control the amount and angle of exhaustion of the combustion gases necessary to obtain the desired thrust modulation.

The problems inherent in forming thrust modulation ports in filament-wound, resin-impregnated rocket motor casings have not been solved adequately by the methods previously used. A conventional method involves the undesirable feature of cutting out and removing portions of the casing thus severing a very large number of filaments. The resulting discontinuity of filamentary structure severely weakens the casing, necessitating large amounts of reinforcement around the port. Such reinforcement usually takes the shape of thin preformed rings concentric with the port and interspersed between the layers of severed filaments. In addition, a rupturable diaphragm and its supporting structure must be present to seal the port prior to initiation of thrust modulation. Both the reinforcing rings and diaphragm structure have the decided disadvantage of adding considerable weight and complexity to the motor casing.

It is an object of this invention to provide an improved thrust modulation device for filament-wound rocket motor casings.

Another object of this invention is to provide such a device which has a simplified structure and is easily installed as a part of the motor casing.

A further object is to provide such a device which minimizes its interference with the filamentary structure of the motor casing.

Other objects, advantages and features of this invention will become apparent from the following description and accompanying drawings.

In general, the device of my invention comprises an apertured base member which abuts the interior surface of a rocket motor casing and is in communication with the combustion chamber, and an apertured tie-down member which abuts the exterior surface of the casing. The members are aligned so that their apertures lie substantially opposite each other. Extending through the casing and connecting the two apertured members are fasteners which force the two members to abut tightly the interior and exterior casing surface, respectively. An explosive charge is positioned adjacent to the base member. Upon ignition of this charge, its force, which is directed toward the casing, ruptures the casing between the apertures. The gases in the combustion chamber can then escape through this opening in the motor casing resulting in thrust modulation.

Figure 1:
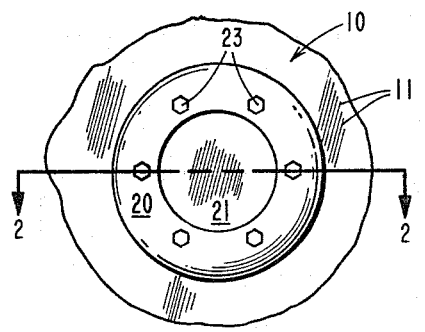
FIGURE 1 is a fragmentary plan view of one embodiment of the device of this invention as seen from the outside of a rocket motor casing.
Figure 2:
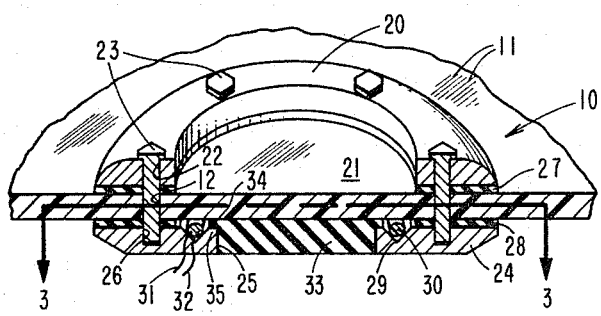
FIGURE 2 is a semi-diagrammatic, perspective, cross-sectional view taken on line 2—2 of FIGURE 1.

Referring now to FIGURES 1 and 2 of the drawings, a rocket casing, indicated generally at 10 is composed of wound bands filaments 11 impregnated with a resinous material. Located in the casing 10 are perforations 12. A tie-down member 20 having a central aperture 21 and holes 22 is attached to the outer surface of the casing 10 by fasteners 23. These fasteners extend through holes 22 in the tie-down member 20 and perforations 12 in the casing 10 and are threaded into holes 26 in a base member 24 having a central aperture 25. Flexible gaskets 27 and 28 are placed between the casing 10 and tie-down member 20 and base member 24, respectively. An annular groove 29 in the base member 24 opens toward the casing 10. Contained within the groove 29 is an explosive charge 30 having electrical leads 31 and 32 which can be attached to any igniting device such as a conventional squib (not shown). A plug 33 which insulates explosive charge 30 and casing 10 from combustion gases is mounted within the aperture 25 by means of flange 34 bearing upon shoulder 35 of base member 24.

The configuration of the tie-down member 20 is not limited to any particular shape so long as it contains a central aperture 21 through which combustion gases can escape following rupture of the casing 10 within the area of the aperture. Thus the member 20 itself and its aperture 21 can be annular, square or any other suitable shape. The inside wall of member 20 defining central aperture 21 can be either substantially perpendicular to or angled with the surface of motor casing 10 so as to control the direction of the escaping gases. When the inside wall of member 20 is angled with respect to the outer surface of motor casing 10, the thickness of member 20 can vary from one portion to another. This presents the escaping gases with an enlarged deflecting wall surface in the area of increased thickness, resulting in greater control of the direction of the escaping gases. It is preferable that the tie-down member 20 have a relatively large surface abutting the motor casing in order to distribute any stress encountered over as wide an area as possible. This member should also have this surface contoured to the curvature of the motor casing. It is also desirable that its thickness be minimized to reduce its weight and size. However, the thickness must be sufficient to withstand any stress placed upon the member during the operation of the rocket motor and during the rupture of the motor casing.

The fasteners 23 of my invention can be of any type such as rivets, threaded bolts, etc. If non-adjustable fasteners such as rivets are used, they will have a length predetermined by the thickness of the casing in order that they can hold the tie-down member 20 and base member 24 in tight clamping engagement with the casing 10. If adjustable fasteners, such as bolts are used, they can be threaded into the tie-down member 20 or the base member 24 or adjusting nuts can be threaded on either or both ends of the bolts. Either the heads of the bolts and/or the nuts can be recessed into either or both members. The number and diameter of the fasteners 23 are kept to a minimum to reduce interference with the filamentary structure of the motor casing 10. These fasteners 23 are of sufficient strength to maintain the tie-down member 20 and the base member 24 firmly in place during the operation of the rocket motor and rupture of the casing 10.

The base member 24, like the tie-down member 20, is not limited to any particular shape. Its inside wall defining central aperture 25 also can be either substantially perpendicular to or angled with the inside surface of motor casing 10. When the inside wall is angled with respect to the inner surface of motor casing 10, the thickness of base member 24 also can vary from one portion to another. It is preferable that the base member have a relatively large surface abutting the casing 10 and contoured to its curvature. Preferably its thickness is minimized to reduce its weight and size. The explosive charge 30 and insulating plug 33 can be mounted in any convenient manner in the base member 24.

As can be ascertained from the previous description of the thrust modulation device of this invention, its structure has two essential features. The first is the incorporation of two aligned, apertured members as a part of a filament-wound motor casing. These members, when drawn by fasteners extending through the casing into a tight, clamping engagement with each of the surfaces of the casing, limit the rupture of the filaments of the casing to the area between the two apertures. The second is that the diameter of the fasteners extending through the motor casing be kept to a minimum to reduce interference with the continuity of the filamentary structure of the casing. For example, the fastener diameter is preferably equal to or less than the thickness of the casing.

Generally, the structural components of my device can be made of any material which can withstand the forces experienced during the operation of the rocket motor and the device itself. Preferably, metals such as steel, aluminum, etc. are used. Since the rocket motor casing is formed of layers of filaments as for example, glass, steel, etc., impregnated with materials such as epoxy resins, it is often desirable to eliminate the direct bearing of metal members upon the surfaces of the motor casing. In order to distribute the shear loadings between these two surfaces, suitable buffers such as rubber gaskets 27 and 28 are used. If desirable, a small amount of reinforcement, such as thin metal rings can be interspersed between the layers of fibers surrounding the area of the casing to be ruptured.

Figure 3:
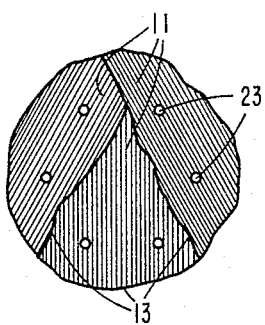
FIGURE 3 is a view of the invention taken on line 3—3 of FIGURE 2.

One of the advantageous features of my device is its ease of installation in a filament-wound rocket motor casing. It can be installed in the finished casing 10 by aligning holes 22 of tie-down member 20, perforations 12 of the casing and holes 26 of base member 24, inserting fasteners 23 through holes 22 and perforations 12 and threading them into holes 26 until the two members tightly abut the casing. In order to preserve a maximum continuity of filament structure, the holes in the casing through which the fasteners are inserted cut the same filaments wherever possible. Thus, as more particularly illustrated in FIGURE 3, it is highly desirable to have at least two fasteners 23 aligned so as to pass through the same filaments 11 in any single layer 13 of the motor casing. If desirable, a base member having an explosive charge and a protective cover mounted in its aperture can be installed on the exterior surface of the motor casing and a tie-down member having an insulating plug mounted in its aperture can be installed on the interior surface using the same procedure as described above.

Figure 3A:
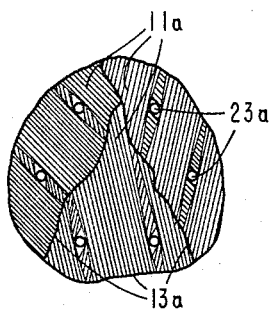
FIGURE 3a shows a modification of the structure of FIGURE 3.

An alternate method of installing my device in a filament-wound motor casing comprises securely inserting fasteners into a base member. This part of the structure, with the fasteners protruding upwardly, is attached to the mandrel upon which the layers of filament are to be wound. As the layers of filaments are laid down around the mandrel, it is merely necessary, as particularly illustrated in FIGURE 3a, to displace the filaments 11a from their natural path, by, at most, one-half the diameter of the fasteners 23a. Each displaced filament 11a in any single layer 13a of the motor casing should be oriented so as to deviate around only one fastener 23a. Following completion of the winding operation, the tie-down member is tightly clamped to the exterior surface of the finished casing by attaching it to the portions of the fasteners 23a which protrude from the outer layer of filaments 11a. As described in the prior method, positions of the base member and tie-down member can be reversed.

The operation of this device to effect thrust modulation in a rocket motor can be carried out by igniting explosive charge 30 which is mounted directly in, or adjacent to, aperture 25 of base member 24. The force of the explosion, which is directed toward the casing 10 of the rocket motor ruptures this casing. However, because of the reinforcement imparted to the casing 10 by tie-down member 20 and base member 24, the rupture of the casing is confined to the area between apertures 21 and 25 of these two members. If insulating material such as plug 33 is located within the aperture 25 of base member 24, it is pushed outwardly ahead of the high pressure combustion gases as they escape through the ruptured casing. The thrust imparted to the rocket motor by these gases effects thrust modulation.

The desired thrust modulation of a rocket motor, whether it be reduction, termination or reversal, can be obtained by predetermining the appropriate number, size, shape and position of my devices. If the exhaustion of gases through the ruptured casing lowers the combustion chamber pressure sufficiently to end combustion of the propellant, formation of gases ceases and thrust termination is effected. However, if combustion of the propellant continues after rupture of the casing, then the escaping gases can be directionally controlled to create thrust in opposition to the thrust produced by the exhaust nozzle of the motor, as for example by angling the inside walls of the tie-down member 20 and/or the base member 24 or by positioning one or more of the thrust modulation devices on a forwardly-biased portion of the motor casing 10. If this opposite thrust is lower than, equal to, or greater than the thrust at the nozzle, the net result is to effect, respectively, thrust reduction, thrust equalization or thrust reversal of the rocket.

In addition to those already enumerated, other advantages of my device are realized. Due to its simplified structure and installation, material and production costs are reduced. There is a substantial reduction in weight. Because of the almost negligible interference with the filamentary structure of the motor casing, there is a wide latitude in the number and placement of these devices. These and other highly desirable results are gained from the use of the new and greatly improved thrust modulation device of this invention.

As will be apparent to those skilled in the art, various other modifications can be carried out from the above disclosure without departing from the spirit and scope of the invention embodied within the claims.

I claim:
1. A fluid-venting device adapted for use in a pressure vessel having a filament-wound casing, said device comprising
 (a) a first member having a first aperture,
 (b) a second member having a second aperture, the diameter of said second aperture being smaller than the diameter of said first aperture,
 (c) fastening means adapted to extend through said casing from said first member to said second member for fixedly mounting said first and second members opposite each other on opposite sides of said casing in tight clamping engagement therewith, and
 (d) rupturing means, mounted on the portion of said second member which extends radially inwardly relative to said first member, for rupturing the portion of said casing contiguous with said apertures to provide a passageway through said casing.

2. A fluid-venting device as defined in claim 1 in which the surface of said first member and the surface of said second member which are adapted to engage said casing are contoured to the curvature of said casing to permit complete engagement of said first and second members with said casing.

3. A fluid-venting device as defined in claim 1 wherein said first and second members are toroidal and include a plurality of fastener receiving holes spaced about said first and second apertures, respectvely.

4. A fluid-venting device as defined in claim 1 wherein said fastening means comprises a plurality of fasteners spaced about said first and second apertures.

5. A fluid-venting device as defined in claim 1 including a groove provided in said portion of said second member on the surface thereof adjacent to said casing, said rupturing means being mounted in said groove.

6. A fluid-venting device as defined in claim 4 wherein each of said fasteners includes an elongated shaft portion, said shaft portion being adapted to extend through said casing and having a width no larger than the thickness of the casing, the shaft width being substantially less than the diameter of said first and second apertures.

7. A fluid-venting device as defined in claim 1 wherein said first and second members are adapted to be mounted on said casing such that said first and second apertures are aligned along a line perpendicular to said outer surface of said casing.

8. A fluid-venting device as defined in claim 1 wherein said first and second members are adapted to be mounted on said casing such that said first and second apertures are aligned along a line forming an acute angle with said casing, said line lying in a plane defined by said line and the longitudinal axis of said casing.

9. A fluid-venting device as defined in claim 1 wherein said rupturing means comprises an explosive charge.

10. A fluid-venting device as defined in claim 9 wherein said explosive charge is mounted in a groove provided in the surface of said second member adapted to be mounted adjacent said casing.

11. In combination, a pressure vessel having a filament-wound casing and a fluid-venting device, said device comprising
(a) a first member including a first aperture,
(b) a second member including a second aperture,
(c) fastening means extending through said casing from said first member to said second member, said fastening means fixedly mounting said first and second members opposite each other on the outer and inner surfaces, respectively, of said casing in tight clamping engagement therewith, and
(d) rupturing means mounted adjacent to one of said members for rupturing the portion of said casing contiguous with said apertures to provide a passageway through said casing.

12. The combination as defined in claim 11 in which the surface of said first member and the surface of said second member which engage said casing are contoured to the curvature of said casing to permit complete engagement of said first and second members with said casing.

13. The combination as defined in claim 11 wherein an insulating plug is mounted in said second aperture.

14. The combination as defined in claim 11 wherein said fastening means comprises a plurality of fasteners, each of said fasteners including an elongated shaft portion which extends through said casing, said shaft portion having a width no greater than the thickness of the casing, the shaft width being substantially less than the diameter of said first and second apertures.

15. The combination as defined in claim 14 wherein a plurality of holes are provided through said casing to receive said fasteners, said holes having dimensions corresponding to the width dimensions of said fasteners.

16. The combination as defined in claim 11 wherein said first and second members are mounted on said casing such that said first and second apertures are aligned along a line perpendicular to said outer surface of said casing.

17. The combination as defined in claim 11 wherein said first and second members are mounted on said casing such that said first and second apertures are aligned along a line forming an acute angle with said casing, said line lying in a plane defined by said line and the longitudinal axis of said casing.

18. The combination as defined in claim 17 wherein said acute angle faces the front end of said casing.

19. The combination as defined in claim 17 wherein said acute angle faces the rear end of said casing.

20. The combination as defined in claim 11 wherein said rupturing means comprises an explosive charge.

21. The combination as defined in claim 20 wherein said explosive charge is mounted in a groove provided in the surface of said second member adjacent said casing.

22. The combination as defined in claim 11 wherein said fastening means passes between adjacent filaments of said casing.

23. The combination as defined in claim 11 wherein said pressure vessel is a gas-generating motor.

24. The combination as defined in claim 23 wherein
(a) the portion of the filaments of said casing which are downstream from a combustion chamber located within said casing are continuous and unperforated, and
(b) said fastening means passes between adjacent filaments of said portion of said casing.

References Cited by the Examiner
UNITED STATES PATENTS

| | | | |
|---|---|---|---|
| 2,474,826 | 7/1949 | Cantlin | 220—47 |
| 2,848,133 | 8/1958 | Ramberg. | |
| 2,850,976 | 9/1958 | Seifert. | |
| 2,995,011 | 8/1961 | Kimmel | 60—35.6 |
| 3,052,091 | 9/1962 | D'Ooge | 60—35.54 X |
| 3,109,553 | 11/1963 | Fike | 220—47 |

MARK NEWMAN, *Primary Examiner.*

ABRAM BLUM, RALPH D. BLAKESLEE,
*Examiners.*

W. A. SCHUETZ, *Assistant Examiner.*